(12) United States Patent
Macaluso et al.

(10) Patent No.: US 8,571,026 B2
(45) Date of Patent: Oct. 29, 2013

(54) SYSTEM AND METHOD FOR AN INTELLIGENT LOAD CENTER WITH INTEGRATED POWERLINE COMMUNICATIONS NETWORK SWITCHING AND NETWORK MANAGEMENT CAPABILITIES

(75) Inventors: Michael Macaluso, Highland Park, NJ (US); Oleg Logvinov, East Brunswick, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 1972 days.

(21) Appl. No.: 11/128,498

(22) Filed: May 12, 2005

(65) Prior Publication Data

US 2005/0271086 A1 Dec. 8, 2005

Related U.S. Application Data

(60) Provisional application No. 60/570,154, filed on May 12, 2004.

(51) Int. Cl.
*H04L 12/28* (2006.01)

(52) U.S. Cl.
USPC ......................................... 370/390

(58) Field of Classification Search
None
See application file for complete search history.

(56) References Cited

U.S. PATENT DOCUMENTS

| 5,386,147 | A  | * | 1/1995  | Bonneau et al. ............... 307/64 |
| 6,373,377 | B1 | * | 4/2002  | Sacca et al. .................... 375/257 |
| 6,590,493 | B1 | * | 7/2003  | Rasimas et al. .......... 340/538.12 |
| 7,199,699 | B1 | * | 4/2007  | Gidge ...................... 340/310.11 |
| 7,457,763 | B1 | * | 11/2008 | Garrow et al. ...................... 705/8 |
| 7,715,425 | B2 | * | 5/2010  | Yonge et al. .................. 370/437 |
| 2004/0036478 | A1 | * | 2/2004 | Logvinov et al. ............. 324/534 |
| 2004/0090312 | A1 | * | 5/2004 | Manis et al. ............. 340/310.02 |
| 2005/0143851 | A1 | * | 6/2005 | Scalfani et al. ............... 700/108 |
| 2007/0010916 | A1 | * | 1/2007 | Rodgers et al. ............... 700/295 |
| 2007/0132603 | A1 | * | 6/2007 | Edlund et al. ................. 340/665 |
| 2007/0222295 | A1 | * | 9/2007 | Wareham et al. ............... 307/32 |
| 2008/0015740 | A1 | * | 1/2008 | Osann, Jr. ..................... 700/276 |
| 2008/0205606 | A1 | * | 8/2008 | Binder ....................... 379/93.01 |
| 2010/0049866 | A1 | * | 2/2010 | Friedman ..................... 709/231 |

\* cited by examiner

*Primary Examiner* — Chirag Shah
*Assistant Examiner* — Amar Persaud
(74) *Attorney, Agent, or Firm* — Slater & Matsil, L.L.P.

(57) ABSTRACT

In a typical powerline communications environment, all electrical outlets and branches are connected to a load center. In this type of electrical system, all communication devices will share the same frequency spectrum, limiting the maximum bandwidth of the network, where all nodes are in contention with each other. In the inventive system, the electrical load center would provide filtering to isolate all branches off the load center into different network segments all capable of carrying the maximum bandwidth allowed by the physical layer technology. The advantages of the method described by this invention will be most noticeable when high bandwidth devices are communicating with each other on the same electrical segment, for example a HDTV receiver communicating with a HDTV monitor in the same room.

10 Claims, No Drawings

SYSTEM AND METHOD FOR AN INTELLIGENT LOAD CENTER WITH INTEGRATED POWERLINE COMMUNICATIONS NETWORK SWITCHING AND NETWORK MANAGEMENT CAPABILITIES

CROSS REFERENCE TO RELATED APPLICATION

This application claims the benefit of U.S. Provisional Application Ser. No. 60/570,154 filed May 12, 2004, assigned to the assignee of this application and incorporated by reference herein.

FIELD OF THE INVENTION

The present invention relates generally to the distribution of content, such as audio, video or other data, over a local communications network, such as a powerline network, and, more particularly, to utilizing an intelligent electrical load center to optimize the distribution of, and maximize the available bandwidth for, the content to be delivered over a local network, by isolating all the network branches of the load center into different network segments all capable of carrying the maximum bandwidth allowable by the physical medium.

BACKGROUND OF THE INVENTION

There exists the need to deliver multimedia content within the housing structures (residential and commercial) while minimizing the latency, improving the reliability, and providing sufficient bandwidth for such delivery. It is also important to minimize the cost of the installation as well as assure that the performance of the multimedia content delivery platforms is independent from the location within the building structure. Existing powerline communication technologies satisfy the last two requirements, ease of installation and predictability of the coverage. (See HomePlug 1.0 performance report www.homeplug.org). The second generation of these technologies will also likely provide improved bandwidth, and methods can be employed to provide measurable latency and QoS (See U.S. application Ser. No. 10/991,939 filed Nov. 18, 2004, assigned to the assignee of this application and incorporated by reference herein). Unfortunately, high bandwidth multimedia content, such as one or more HDTV streams, can tax the available bandwidth of the network, especially when other applications are occurring simultaneously. There exists a need to further improve the available bandwidth of these network segments to adequately support these content deliveries.

SUMMARY OF THE INVENTION

In a typical powerline communication environment, all electrical outlets and branches are connected to a load center. Load centers may in turn be connected to other load centers, and eventually back to a master load center where the main power feed enters the electrical system.

In an electrical system as described above, generally speaking, all communication devices will share the same frequency spectrum, limiting the maximum bandwidth of the network, where all nodes are in contention with each other. Hidden nodes will exist as the reach and extent of the electrical networks challenges the communication technology with regard to maximum signal propagation distances.

In the proposed system, the electrical load center would provide filtering to isolate all branches off the load center into different network segments all capable of carrying the maximum bandwidth allowed by the physical layer technology. For example, if the load center had 12 circuits, and the bandwidth of the physical layer technology could support 100 Mbps, the maximum simultaneous data on the powerline network would be increased by a power of 12 to 1.2 Gbps. The advantages of the method described by this invention will be most noticeable when high bandwidth devices are communicating with each other on the same electrical segment, for example a HDTV receiver communicating with a HDTV monitor in the same room.

DETAILED DESCRIPTION OF THE INVENTION

Due to the nature of the powerline environment, in most powerline communication systems, a method of channel estimation must be performed on each communication link in order to determine the frequencies that will allow data to be transmitted, and at what rate. This method enables very media efficient communications for point-point, or unicast network traffic. In order for multicast traffic to be supported, it is required for the transmitter to transmit data using an encoding method guaranteed to be decipherable by all receiving stations. This can be done in many different ways. It can be simply broadcast in the most reliable method, or in a more intelligent implementation, a common set of frequencies may be used increasing the efficiency. In either case, the time taken to transmit a given packet will increase due to the extra error coding required. The extent to which the transmission or packet time is increased can be substantial, even orders of magnitude. When the transmission time of a packed is increased, due to the shared nature of the physical media, the available bandwidth for the current session, and all other sessions present on the network is decreased proportionally, and if the increase was an order of magnitude, a 100 Mbps class network was just reduced to a 10 Mbps class network.

In a home environment, it is very easy to assume that a lot of high bandwidth communications present on the network will be data from high definition television streams. If one considers the source and possible sinks of such data, it is likely that streams will be to multiple televisions, and those televisions will be in different rooms, and furthermore the possibility that they exist on different load center branches, or circuits.

Now let's consider this scenario further. In a legacy powerline communication network, the source device would stream the HDTV data, which would originate on one branch circuit, through the load center, to the multiple televisions located in different rooms, which would likely each be on a different branch circuit. In order for this multicast traffic to be supported, it is required for the transmitter to transmit data using an encoding method guaranteed to be decipherable by all receiving stations. This can be done in many different ways. It can be simply broadcast in the most reliable method, or in a more intelligent implementation, a common set of frequencies may be used to increase the efficiency. It is likely that the communication parameters of each segment, or branch, of this data stream path are different, and therefore the optimum, or maximum bandwidth, set of parameters and communication frequencies will also be different. The transmitter, however, will need to find the common set of parameters and frequencies that will work to support data transmission to all of the destination devices. The net result is the transmitter will need to use what could be viewed as the "least common denominator" set of transmission parameters to accomplish the data distribution. With the present invention, it is possible to distribute multicast traffic in a much more efficient manor. Since the network is segmented, the load center switch device can communicate with devices on different branches of the circuit by retransmitting the data destined for a specific device with communication parameters, which reflect the best possible use of the channel. The switch device would replicate the data on each branch of the network to all devices that need to receive the stream. In this scenario, each branch would be assigned communication parameters that offer the most bandwidth for that branch. This would not only increase the bandwidth for each branch, it would also isolate each branch circuit from the rest of the network, so that any data distribution applications are only using bandwidth on the branches that are required. For many applications, this would result in the overall network bandwidth to be increased substantially.

The invention consists of an apparatus for isolating the communication signals for each individual branch circuit from the rest of the powerline network. The isolated communications signals from each branch circuit are then presented to an individual powerline interface circuit. The individual powerline interfaces are then connected to a backplane and management system, which orchestrates the switching of network traffic. For purposes of highlighting the features of the present invention, management of distribution of content among a plurality of devices located throughout a content distribution communications network is described in connection with content distribution over a broadband powerline network and a local area network operating based on powerline communication. It is to be understood, however, that the present invention is applicable on a network based on any medium, wired or wireless.

Although preferred embodiments of the present invention have been described and illustrated, it will be apparent to those skilled in the art that various modifications may be made without departing from the principles of the invention.

What is claimed is:

1. A method of operating a multi-carrier communications system, the multi-carrier communications system including a plurality of communications nodes coupled to one another over a communications medium, wherein the communications medium includes a load center comprising a main power feed line and a plurality of powerline branch circuits, the method comprising: (a) receiving, over a powerline, from a data source a multi-cast signal destined to be transmitted over a powerline to a plurality of devices on a plurality of respective powerline branch circuits, (b) determining at the load center optimized communication parameters for each of the plurality of powerline branch circuits, (c) re-transmitting the multi-cast signal over the plurality of powerline branch circuits using a plurality of respective optimized communication parameters, (d) providing blocking filtering for undesired powerline communications signals on each powerline branch circuit, (e) passing desired powerline communications signals on respective powerline branch circuits and thereby isolating each powerline branch circuit to its own communications signals, (f) providing noise filtering to reduce the effect of noise on the aggregate communications bandwidth, (g) operating the load center as a network switch or a router where each switch or router port is connected to a respective isolated branch circuit or main feed circuit, and (h) monitoring power quality on each segment of the network using the load center.

2. The method of claim 1 further comprising, providing a network segmentation function by using blocking filters on each powerline branch circuit and the main power feed line, where the main power feed line is connected to a utility network, with a broadband powerline network outside of a home portion of the powerline network.

3. The method of claim 2, wherein the load center is also equipped with high frequency signal ports connected to respective segments of the powerline network on the house side and an external feed side.

4. The method of claim 1 further comprising, configuring the load center to monitor high-frequency components of the power on each segment of the network and detect signatures indicative of a present or imminent equipment failure.

5. The method of claim 1 further comprising, configuring the load center to monitor power consumption on each powerline branch circuit or selected powerline branch circuits.

6. The method of claim 1 further comprising, configuring the load center to communicate with a power meter and outside and inside temperature sensors.

7. The method of claim 6 further comprising, configuring the load center to process power consumption data, and temperature information to determine equipment efficiency.

8. The method of claim 7 further comprising, configuring the load center to store locally, or on the network, historical data that can be used to analyze equipment performance and detect maintenance requirements.

9. The method of claim 8 further comprising, configuring the load center to generate email/sms alerts.

10. The method of claim 1 further comprising, configuring the load center with a power plane configuration designed to either couple branch circuits at a high frequency (2 MHz to 100 MHz) or create signal auto-canceling.

* * * * *